(12) United States Patent
Zhang et al.

(10) Patent No.: US 12,572,539 B2
(45) Date of Patent: Mar. 10, 2026

(54) PARAMETERIZED STRUCTURED QUERY LANGUAGE VIEW SHARING

(71) Applicant: SAP SE, Walldorf (DE)

(72) Inventors: Xun Zhang, Xi'an (CN); Yinghua Ouyang, Xi'an (CN); Yanchen Cao, Xi'an (CN); Zhen Tian, Xi'an (CN)

(73) Assignee: SAP SE, Walldorf (DE)

( * ) Notice: Subject to any disclaimer, the term of this patent is extended or adjusted under 35 U.S.C. 154(b) by 206 days.

(21) Appl. No.: 18/584,273

(22) Filed: Feb. 22, 2024

(65) Prior Publication Data

US 2025/0272285 A1 Aug. 28, 2025

(51) Int. Cl.
G06F 16/2453 (2019.01)
G06F 16/2452 (2019.01)

(52) U.S. Cl.
CPC .. G06F 16/24542 (2019.01); G06F 16/24526 (2019.01); G06F 16/24539 (2019.01)

(58) Field of Classification Search
CPC ......... G06F 16/24542; G06F 16/24539; G06F 16/24526
See application file for complete search history.

(56) References Cited

U.S. PATENT DOCUMENTS 8,984,009 B2 * 3/2015 Fee ...................... G06F 16/172
707/783
12,026,160 B2 * 7/2024 Cruanes ............ G06F 16/24542

2024/0086404 A1 * 3/2024 Lee ................... G06F 16/24542
2024/0362222 A1 * 10/2024 Cui ................... G06F 16/24539

OTHER PUBLICATIONS

Larson, P.-A., Jonathan Goldstein, and Jingren Zhou. "MTCache: Transparent mid-tier database caching in SQL server." Proceedings. 20th International Conference on Data Engineering. IEEE, (Year: 2004).*
Rehrmann, Robin, et al. "OLTPshare: The case for sharing in OLTP workloads." Proceedings of the VLDB Endowment 11.12: 1769-1780. (Year: 2018).*

* cited by examiner

*Primary Examiner* — Kannan Shanmugasundaram
(74) *Attorney, Agent, or Firm* — Mintz Levin Cohn Ferris Glovsky and Popeo, P.C.

(57) ABSTRACT

A database management system (DBMS) receives an input query and parses the received input query to generate an abstract parse tree. Next, the DBMS traverses the abstract parse tree to detect any parameterized structured query language (SQL) views. If a first parameterized SQL view is detected in the abstract parse tree, the DBMS generates a first view parse tree if a first search of a first cache for the first parameterized SQL view results in a miss. Otherwise, the DBMS retrieves, from the first cache, a previously generated view parse tree if the first search of the first cache results in a hit. Then, the DBMS generates a first query compile tree if a second search of a second cache for the first parameterized SQL view results in a miss. Finally, the DBMS generates and executes a query execution plan based on the first query compile tree.

20 Claims, 11 Drawing Sheets

100

DBMS 120

Query Optimizer 122

Query Execution Engine 123

Processing Engine 125

QP PSV Cache 126

QC PSV Cache 127

Database 110

Network 140

Client Device 130

205

```
create table T1(a int );
insert into T1 values (4);
create view PSV1(in i int default 4) as select a from T1 where a = :i; -- PSV has default
       value 4 if user doesn't specify it in query
select * from PSV1(4) union all select * from PSV1(i + 3) union all select * from PSV1();
```

Input query string

*310*

Generate AST

*315*

PSV unfolding

*320*

Preprocessor

*325*

Semantic check

*330*

Find next PSV? — Y

N

*335*

Generate QC tree

*340*

Find next PSV? — Y

N

*345*

Generate QO tree

*350*

Apply optimizer plan

*355*

Select optimal plan

*360*

Generate execution plan

*365*

Execute

600

610 PROCESSOR

620 MEMORY

630 STORAGE DEVICE

640 INPUT/OUTPUT DEVICE

650

*Abstract Parse Tree*
*800*

*FIG. 8*

*View Parse Tree*
*900*

Query Compile
Tree
1000

PARAMETERIZED STRUCTURED QUERY LANGUAGE VIEW SHARING

TECHNICAL FIELD

The present disclosure generally relates to executing a query having a parameterized structured query language (SQL) view.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges when attempting to optimize performance.

SUMMARY

In some implementations, a database management system receives an input query and parses the received input query to generate an abstract parse tree. Next, the database management system traverses the abstract parse tree to detect any parameterized structured query language (SQL) views. If a first parameterized SQL view is detected, the database management system generates a first view parse tree for the first parameterized SQL view responsive to determining that a first search of a first cache for the first parameterized SQL view results in a miss. Otherwise, the database management system retrieves, from the first cache, a previously generated view parse tree corresponding to the first parameterized SQL view responsive to determining that the first search of the first cache for the first parameterized SQL view results in a hit. Then, the database management system generates a first query compile tree for the first parameterized SQL view based on the first view parse tree or the previously generated view parse tree responsive to determining that a second search of a second cache for the first parameterized SQL view results in a miss. Finally, the database management system generates a query execution plan based on the first query compile tree and executes the query execution plan for the received input query.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 2 illustrates an example query, in accordance with some example implementations of the current subject matter;

FIG. 8 illustrates a block diagram of an abstract parse tree, in accordance with some example implementations of the current subject matter;

DETAILED DESCRIPTION

A database query is a mechanism for retrieving data from one or more database tables. Queries may be generated in accordance with a corresponding query language. For example, structured query language (SQL) is a declarative querying language that is used to retrieve data from a relational database. In some cases, a view may be created by retrieving database data in response to a query. A view may contain data from a single database table or the view may combine data from multiple database tables. As used herein, the term "view" may be defined as a derived table. Alternatively, the term "view" may be defined as a virtual database table.

Parameterized views can be used to process data based on parameters that are provided at query execution time. In other words, a parameterized view allows for the definition of a general view which produces context-specific result sets by using parameter values passed at execution time. However, in some cases, queries involving parameterized SQL views may be inefficiently executed. To improve the efficiency of queries with parameterized SQL views (PSVs), PSV sub-tree sharing may be implemented. These sub-trees may include parse trees and initial optimizer trees. This optimization may help to accelerate compile time for queries that contain the same PSV with the same input parameters.

Figure 1:
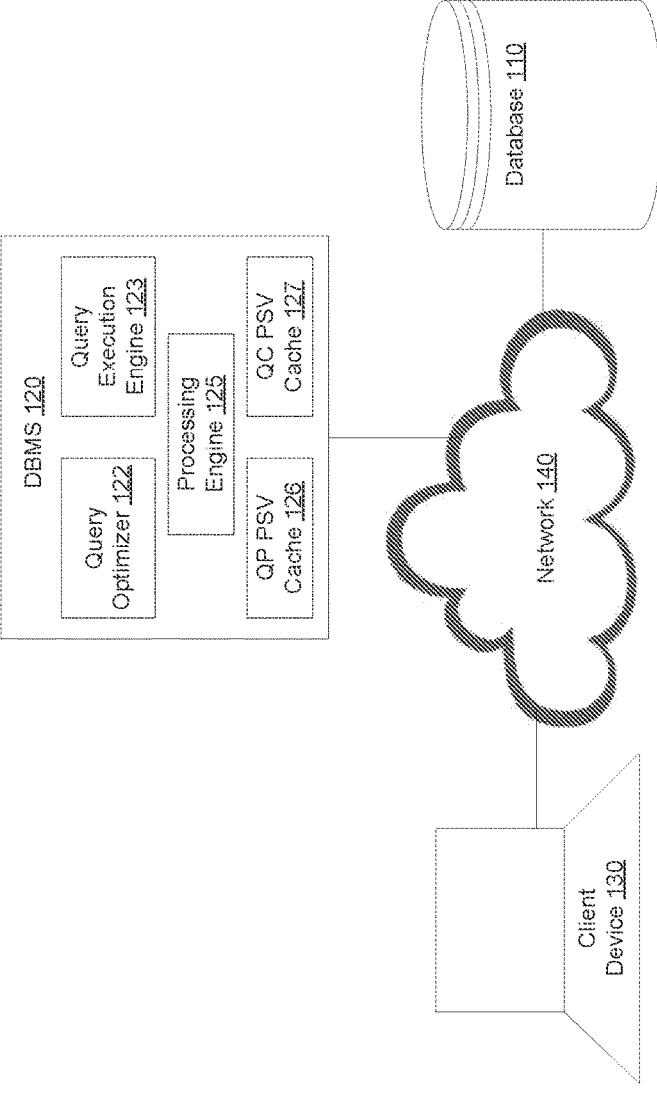
FIG. 1 illustrates a logical diagram of an example of a computing system, in accordance with some example implementations of the current subject matter.

FIG. 1 depicts an example of a computing system 100, in accordance with some example embodiments. Referring to FIG. 1, the computing system 100 may include a database 110, a database management system (DBMS) 120, and a client device 130. In an example, database management system 120 includes a query optimizer 122, query execution engine 123, processing engine 125, query plan (QP) parameterized SQL view (PSV) cache 126, and query compile (QC) PSV cache 127. In other examples, database management system 120 may include other suitable arrangements of components. It is noted that while only a single database 110 and a single client device 130 are shown, this is merely to avoid cluttering the figure. It should be appreciated that database 110 is representative of any number of databases 110 and client device 130 is representative of any number of client devices that may included as part of computing system 100.

From an application or client perspective, it can be extremely cumbersome to access databases such as database 110. For example, an application may need to query different types of databases using complex queries. As a consequence, the application layer in this example would need to be configured to handle the various types of databases and the various query types. Additionally or alternatively, each database 110 may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database 110 and may thus reduce the performance and response times for queries on that database layer.

In some example implementations, there may be provided a query execution engine 123 and/or processing engine 125 that may decouple the higher-level, application layer from the database layer (e.g., the persistence or storage layer where data including database tables may be stored and/or queried using instructions, such as commands and/or the like). The query execution engine 123 and/or processing engine 125 may be implemented separately from the database layer and/or the application layer. Further, the query execution engine 123 and/or processing engine 125 may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The database 110, the database management system 120, and the client device 130 may be communicatively coupled via a network 140. In some example embodiments, the database 110 may be a relational database. However, it should be appreciated that the database 110 may be any type of database including, for example, an in-memory database, a hierarchical database, an object database, an object-relational database, and/or the like. For example, instead of and/or in addition to being a relational database, the database 110 may be a graph database, a column store, a key-value store, a document store, and/or the like.

The database management system 120 may be configured to respond to requests from one or more client devices including, for example, the client device 130. For example, as shown in FIG. 1, the client device 130 may communicate with the database management system 120 via the network 140, which may be any wired and/or wireless network including, for example, a public land mobile network (PLMN), a wide area network (WAN), a local area network (LAN), a virtual local area network (VLAN), the Internet, and/or the like. The client device 130 may be a processor-based device including, for example, a smartphone, a tablet computer, a wearable apparatus, a virtual assistant, an Internet-of-Things (IoT) appliance, and/or the like.

Figure 8:
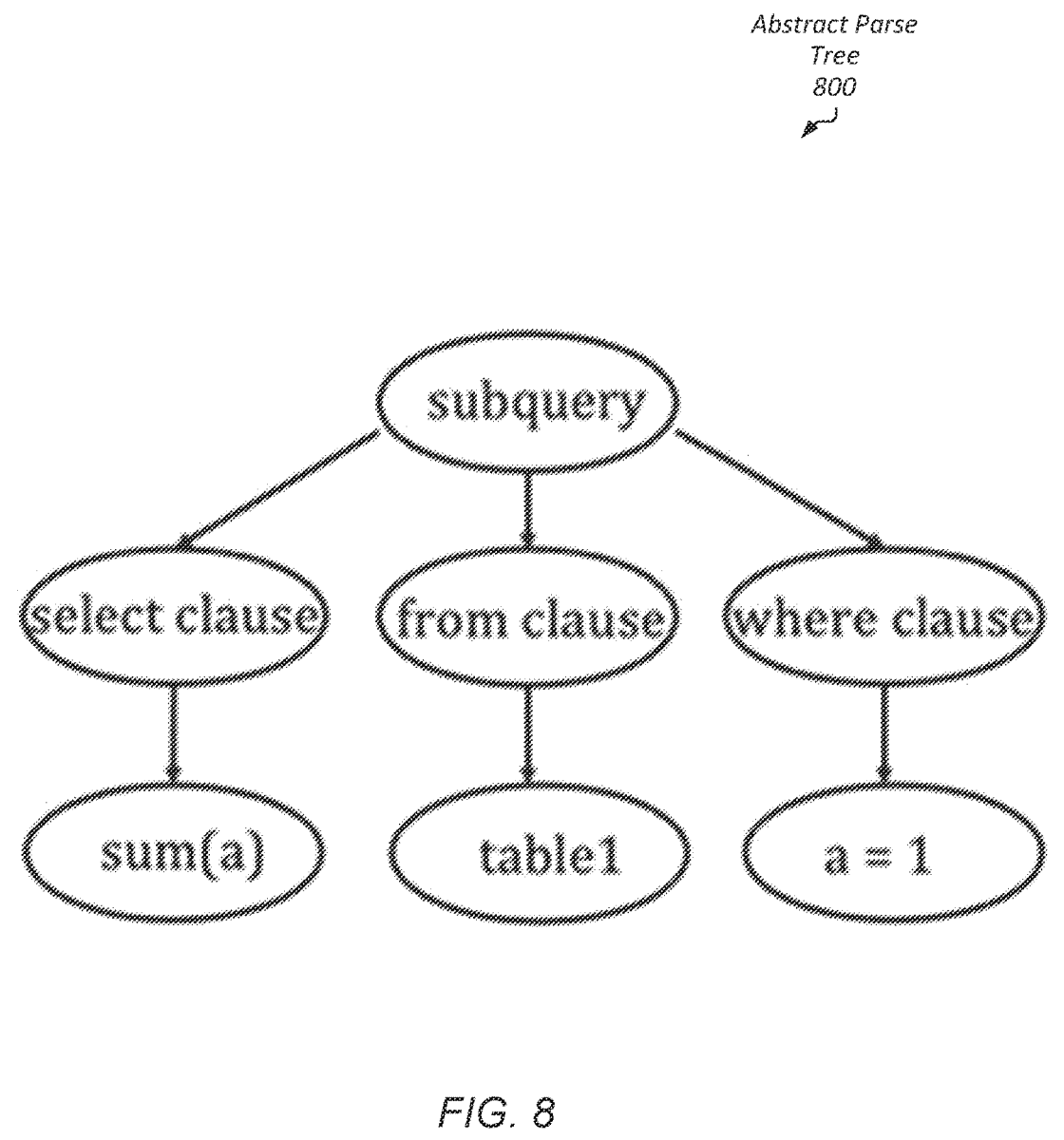

In an example, the client device 130 may send, to the database management system 120, a request to execute a query on the database 110. In response to receiving the request, the database management system 120 may parse the received input query to generate an abstract parse tree. The abstract parse tree is a logical representation of the query. In other words, the abstract parse tree is an abstraction of the logical elements of the original query specification. An example abstract parse tree 800 is shown in FIG. 8, in accordance with some example implementations of the current subject matter. An abstract parse tree is often referred to as an abstract syntax tree (AST). When a SQL query is run, the database management system 120 first parses the query, checking for syntax errors. The result of this parsing is a parse tree, which is an intermediate step towards executing the SQL query. This parse tree is then converted into an abstract parse tree which represents the structure of the SQL statement.

Next, the database management system 120 may traverse the abstract parse tree to detect any parameterized SQL views in the tree. As used herein, the term "parameterized SQL view" is defined as a view that has one or more input parameters, where the input parameters can have default values or non-default values. An example parameterized SQL view is the following: create view PSV1 (in i int default 4) as select a from T1 where a=:i. For each detected parameterized SQL view, the database management system 120 may normalize a set of input parameters of the respective parameterized SQL view into a unified format. Normalizing the input parameters is an attempt to standardize the input parameters. During normalization, common variations expressing the same logic are recognized and rewritten in a standard format. Expressing the input parameters in a standardized way allows for parameters to be normalized to the same format even when the original representation of different sets of parameters varies.

Figure 9:
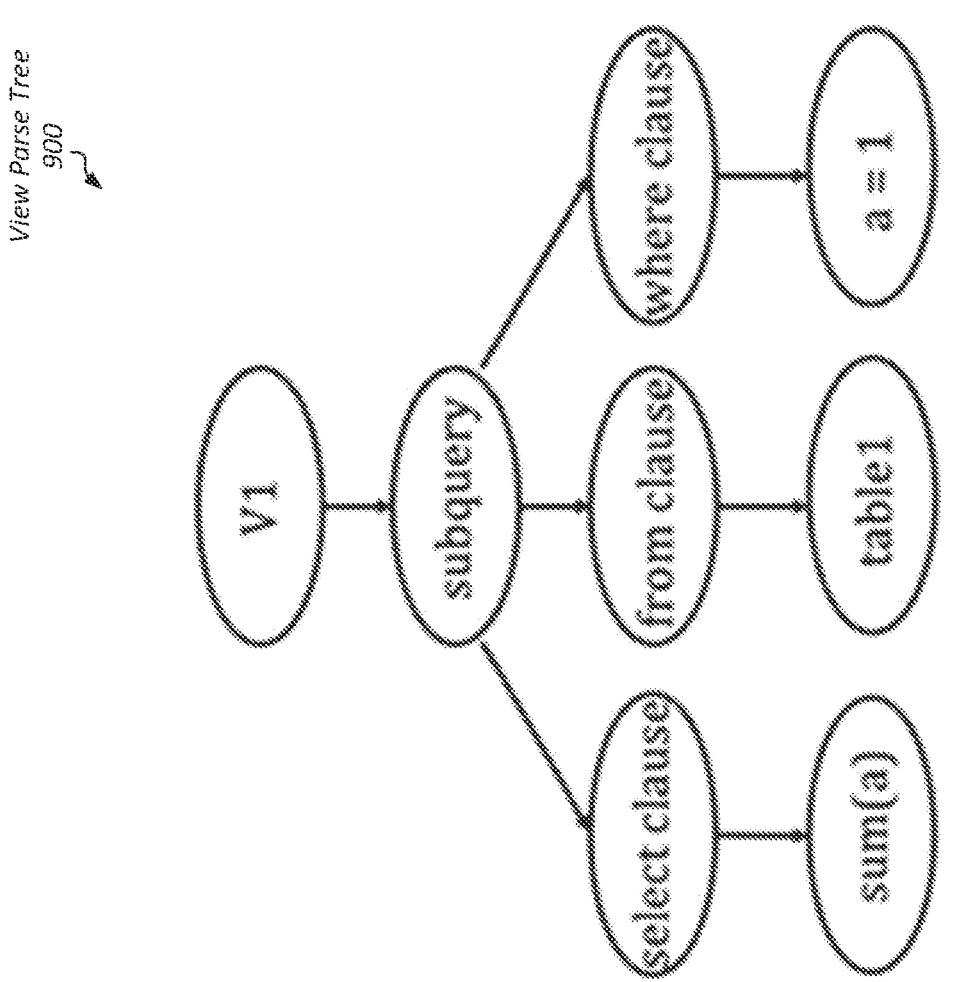
FIG. 9 illustrates a block diagram of a view parse tree, in accordance with some example implementations of the current subject matter.

Then, the database management system 120 may search QP PSV cache 126 for the respective parameterized SQL view with the normalized set of input parameters. If the search is a miss, then the database management system 120 may generate a view parse tree for the detected parameterized SQL view and perform preprocessing and semantics checking on the view parse tree. As used herein, the term "view parse tree" is defined as an abstract parse tree of a view. An example view parse tree 900 is shown in FIG. 9, in accordance with some example implementations of the current subject matter. After generating the view parse tree, the database management system 120 may insert the newly generated view parse tree in the QP PSV cache 126 for the detected parameterized SQL view. If the search is a hit, the database management system 120 may retrieve a previously generated view parse tree from QP PSV cache 126. Then, the database management system 120 may attach either the newly generated view parse tree (if the search was a miss) or the previously generated view parse tree (if the search was a hit) to the abstract parse tree.

Figure 10:
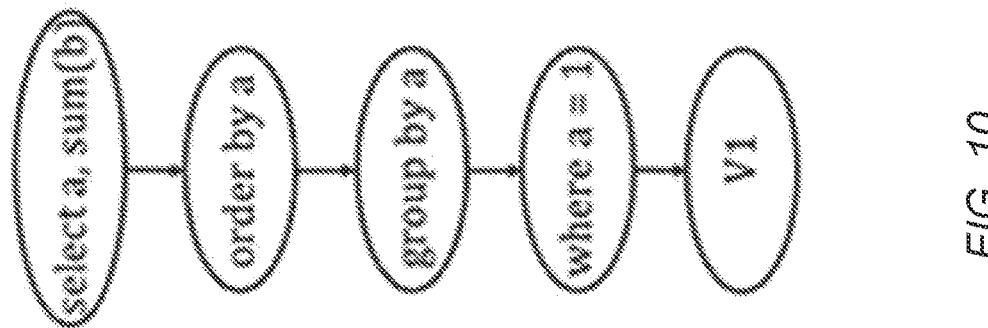
FIG. 10 illustrates a block diagram of a query compile tree, in accordance with some example implementations of the current subject matter.

Next, the database management system 120 may search QC PSV cache 127 for the detected parameterized SQL view. If the search results in a miss, then the database management system 120 generates a new query compile tree for the detected parameterized SQL view based on the view parse tree corresponding to the detected parameterized SQL view, and the database management system 120 inserts the new query compile tree in the QC PSV cache 127. As used herein, the term "query compile tree" is defined as a transition tree between a parse tree and an optimizer tree. During query compilation, a parse tree will be converted into a query compile tree at first, and then the query compile tree will be converted to an initial query optimizer tree. An example query compile tree 1000 is shown in FIG. 10, in accordance with some example implementations of the current subject matter.

If the search of QC PSV cache 127 for the detected parameterized SQL view results in a hit, then the database management system 120 retrieves, from the QC PSV cache 127, a previously generated query compile tree for the detected parameterized SQL view. Then, the database management system 120 traverses the new query compile tree (in the case of a miss) or the previously generated query compile tree (in the case of a hit) for each detected parameterized SQL view in the abstract parse tree to generate a query optimizer tree. Next, the database management system 120 performs query optimization on the query optimizer tree to generate a query execution plan. Then, the query execution plan is executed by query execution engine 123. It is noted that these steps are indicative of one particular implementation, and that other implementations may include other steps, omit one or more of the described steps, and/or perform one or more steps in a different order.

Turning now to FIG. 2, an example query 205 is depicted consistent with implementations of the current subject matter. A database (e.g., database 110 of FIG. 1) may support Parameterized SQL Views (PSVs), which is an abstraction layer on top of the tables for data modeling purposes. With this feature, users can give different input parameter values to a PSV as they can give to procedures or functions. In actual real-use scenarios, a PSV usually appears multiple times in a query. When executing this type of query using the traditional approach, each PSV appearance is unfolded to generate its own view parse tree. Preprocessing and semantics checking are also performed on the view parse tree. Then, each view parse tree is traversed and processed to generate a corresponding query compile (QC) and query optimizer (QO) tree for query optimization. For example, if a PSV appears N times in a query, where N is a positive integer, then the above unfolding, preprocessing, semantics checking, QC tree generation, and QO tree generation will be performed N times according to the existing methodology. This will cause a negative performance impact on query execution. Accordingly, by using the methods and mechanisms disclosed herein, PSV sharing may be implemented to optimize the performance of queries having multiple PSVs with the same input parameters.

In the example query 205, the first statement is "create table T1(a int)", which creates the table T1. This is followed by the second statement: "insert into T1 values (4)", where the values are inserted into the table T1. Next, the third statement is "create view PSV1(in i int default 4) as select a from T1 where a=:i", which creates the PSV for table T1. Finally, the fourth statement is "select * from PSV1(4) union all select * from PSV1(1+3) union all select * from PSV1 (1)", which combines the result sets from multiple PSVs. It should be understood that query 205 is merely representative of one particular query having a PSV. In other implementations, other types of queries with other numbers of statements may be encountered and processed in accordance with the techniques disclosed herein.

Figure 3:
FIG. 3 illustrates an example of a process for generating and executing a query execution plan with PSV views, in accordance with some example implementations of the current subject matter.

Referring now to FIG. 3, a process is depicted for generating and executing a query execution plan with PSV views in accordance with one or more embodiments of the current subject matter. At the beginning of the process, a database management system (e.g., DBMS 120 of FIG. 1) receives an input query string (block 305). Next, the database management system generates an abstract parse tree (AST) (e.g., abstract parse tree 800 of FIG. 8) by parsing the received query (block 310). Then, the database management system traverses the AST and if a parameterized SQL view (PSV) is found, the database management system unfolds the PSV (block 315). Next, the database management system preprocesses the PSV (block 320) and performs a semantic check on the PSV (block 325). Then, the database management system continues traversing the AST and if another PSV is found (conditional block 330, "yes" leg), then method 300 returns to block 315.

If no other PSVs are found (conditional block 330, "no" leg), then for each PSV, the database management system generates a query compile (QC) tree (e.g., query compile tree 1000 of FIG. 10) (block 335). Next, the database management system finds the next PSV (conditional block 340, "yes" leg), and then generates a QC tree for the next PSV tree (block 335). Otherwise, if QC trees have been generated for all of the PSVs in the query (conditional block 340, "no" leg), then the database management system generates a query optimizer (QO) tree for the query (block 345). Next, the database management system applies an optimizer plan (block 350) and selects the optimal plan (block 355). Then, the database management system generates an execution plan (block 360) and executes the generated execution plan (block 365). After block 365, method 300 may end.

With the example of method 300, each PSV appearance is unfolded to generate its own view parse tree and preprocessing and semantics checking are also performed on the view parse tree for each PSV. Each view parse tree is traversed and processed to generated corresponding QC trees for query optimization. In other words, if a PSV appears N times in a query, where N is a positive integer greater than one, then the above steps will be performed N times. This will have a negative impact on query execution performance.

Figure 4:
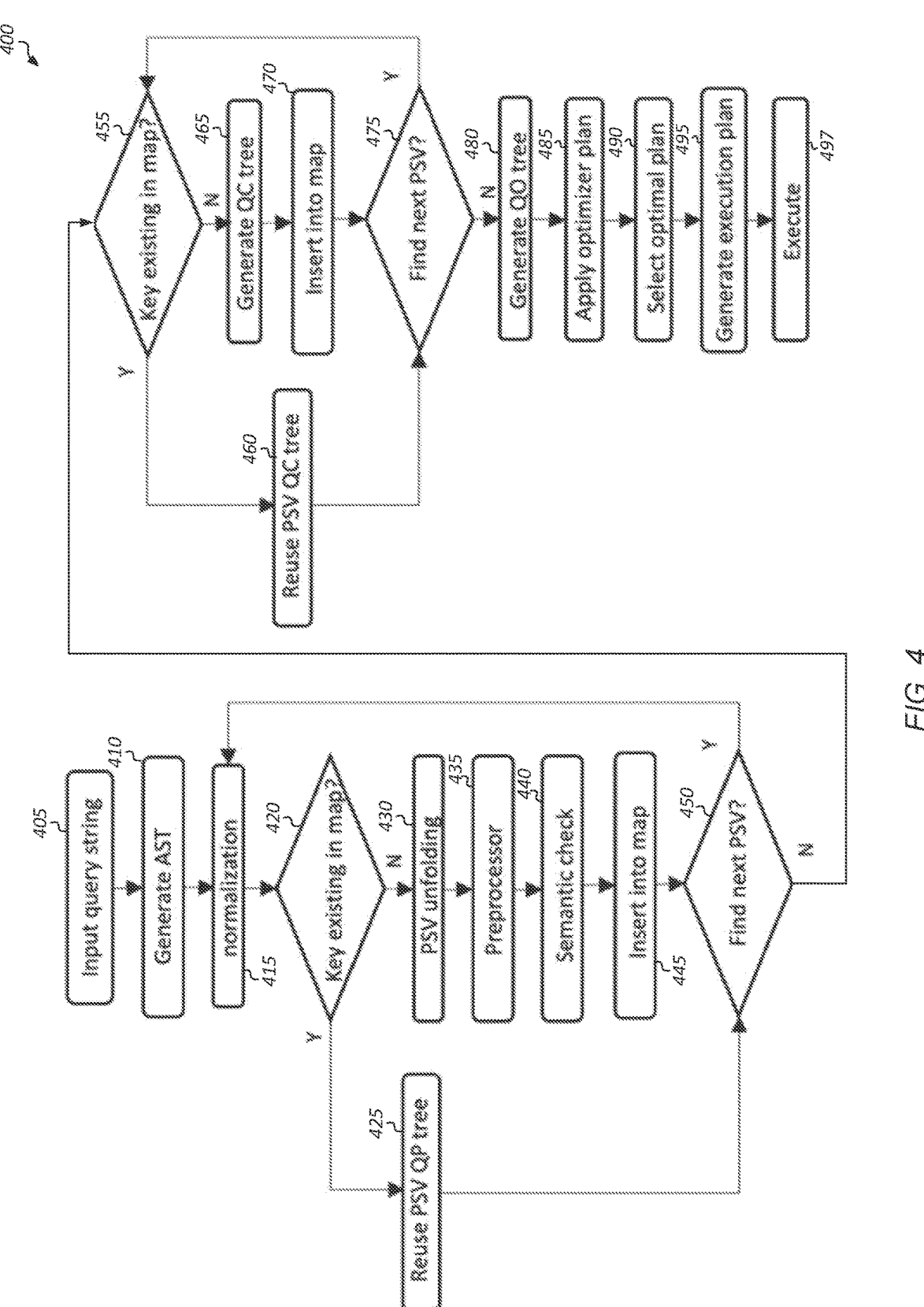
FIG. 4 illustrates an example of a process for optimizing a query by reusing PSV query plan (QP) and query compile (QC) trees, in accordance with some example implementations of the current subject matter.

Turning now to FIG. 4, a process is depicted for optimizing a query by reusing PSV query plan (QP) and query compile (QC) trees in accordance with various embodiments of the current subject matter. At the beginning of method 400, the database management system receives an input query string (block 405). Next, the database management system parses the query to generate an abstract parse tree (AST) (e.g., abstract parse tree 800 of FIG. 8) (block 410). Then, the database management system traverses the PSVs in the AST, and for each PSV, the database management system normalizes the input parameters into a unified format (block 415). Next, the database management system checks whether each PSV with the normalized parameters already exists in the QP PSV cache (i.e., key existing in map) (conditional block 420). If the PSV is already in the cache (conditional block 420, "yes" leg), then the database management system reuses the PSV QP tree from the cache (block 425). After block 425, the database management system determines if there is another PSV in the AST (conditional block 450).

If the PSV is not in the cache (conditional block 420, "no" leg), then the database management system unfolds the PSV to generate a view parse tree (e.g., view parse tree 900 of FIG. 9) for the PSV and attaches the view parse tree for the PSV to the AST (block 430). Next, the database management system performs preprocessing on the view parse tree (block 435). Then, the database management system performs semantics checking on the view parse tree (block 440). Next, the database management system inserts the PSV with normalized parameters and the corresponding view parse tree into the QP PSV cache (i.e., insert into map) (block 445). Then, the database management system determines if there is another PSV in the AST (conditional block 450).

If there is another PSV in the AST (conditional block 450, "yes" leg), then method 400 returns to block 415 with the database management system normalizing the input parameters of the next PSV into a unified format. Otherwise, if there are no other PSVs in the AST (conditional block 450, "no" leg), then the database management system determines whether the PSV with normalized parameters already exists in the QC PSV cache (i.e., key existing in map) (conditional block 455). If the PSV with normalized parameters already exists in the QC PSV cache (conditional block 455, "yes" leg), then the database management system reuses the corresponding PSV QC tree from the cache (block 460). After block 460, the database management system determines whether there is another PSV in the AST (conditional block 475). If the PSV with normalized parameters does not already exist in the QC PSV cache (conditional block 455, "no" leg), then the database management system generates a QC tree (e.g., query compile tree 1000 of FIG. 10) for the PSV based on the view parse tree of the PSV (block 465) and inserts the PSV with normalized parameters and the corresponding QC tree into the QC PSV cache (i.e., insert into map) (block 470).

Next, if there is another PSV in the AST (conditional block 475, "yes" leg), then method 400 returns to conditional block 455. If there is not another PSV in the AST (conditional block 475, "no" leg), then the database management system traverses the generated QC tree to generate a query optimizer (QO) tree (block 480). Next, the database management system performs query optimization on the generated QO tree (block 485) and selects the optimal plan (block 490). Then, the database management system generates an execution plan for the query (block 495) and executes the plan (block 497). After block 497, method 400 may end. It is noted that method 400 is an improvement over method 300 in that method 400 does not involve performing preprocessing and semantics checking multiple times for the same PSV as is the case for method 300.

Figure 5:
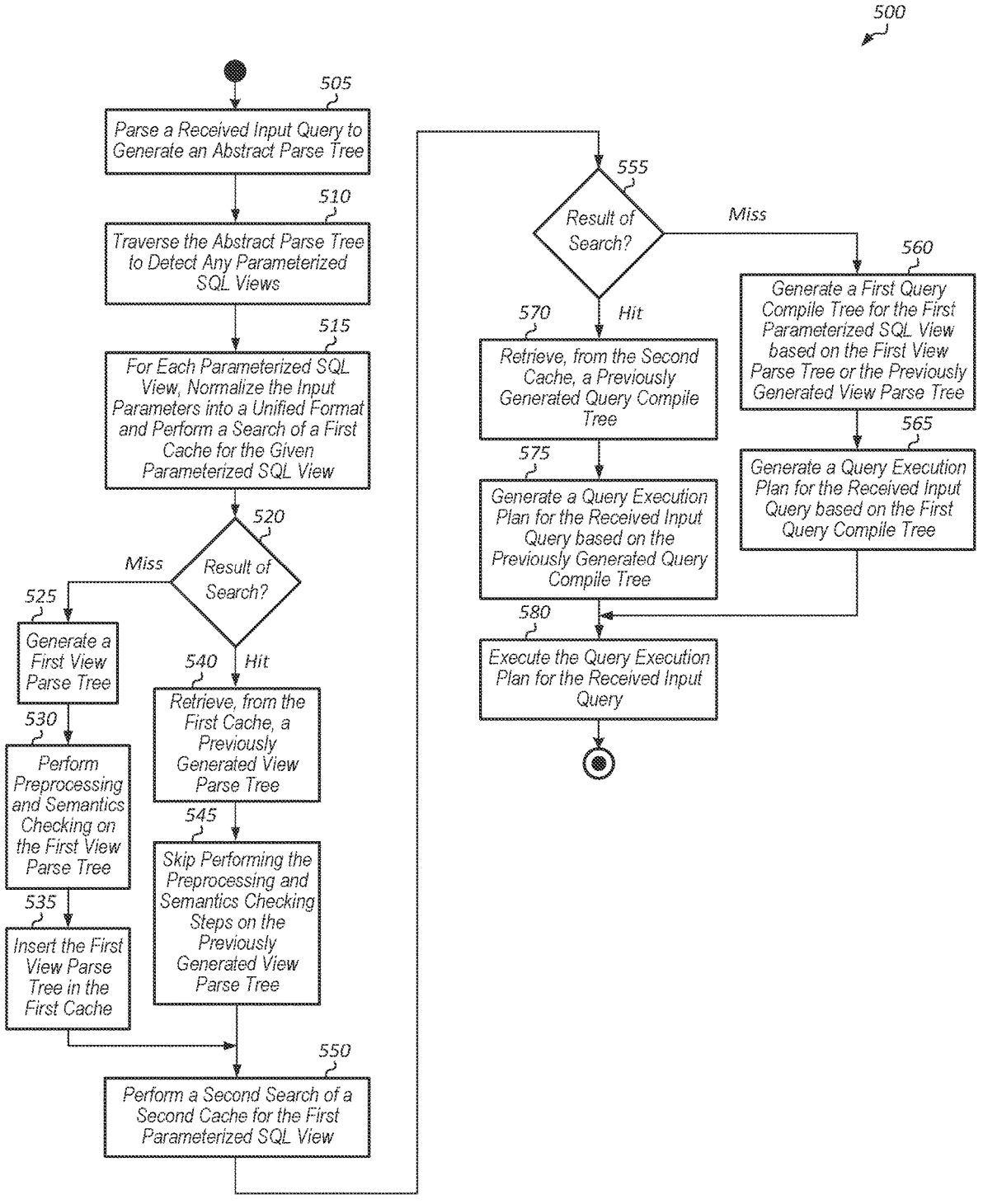
FIG. 5 illustrates an example of a process for sharing parameterized SQL views, in accordance with some example implementations of the current subject matter.

Referring now to FIG. 5, a flow diagram illustrating a process for sharing parameterized SQL views is shown in accordance with various embodiments of the current subject matter. A database management system (e.g., DBMS 120 of FIG. 1) parses a received input query to generate an abstract parse tree (e.g., abstract parse tree 800 of FIG. 8) (block 505). Next, the database management system traverses the abstract parse tree to detect any parameterized SQL views (block 510). For each parameterized SQL view (PSV), the database management system normalizes the input parameters into a unified format and performs a search of a first cache for the given parameterized SQL view (block 515). In an example, the first cache is a query plan (QP) PSV cache (e.g., QP PSV cache 126 of FIG. 1).

If the search of the first cache for the given parameterized SQL view results in a miss (conditional block 520, "miss" leg), then the database management system generates a first view parse tree (e.g., view parse tree 900 of FIG. 9) for the given parameterized SQL view (block 525). The database management system also performs preprocessing and semantics checking on the first view parse tree (block 530). Then, the database management system inserts the first view parse tree in the first cache (block 535).

Otherwise, if the search of the first cache for the given parameterized SQL view results in a hit (conditional block 520, "hit" leg), then the database management system retrieves, from the first cache, a previously generated view parse tree corresponding to the first parameterized SQL view (block 540). Also, the database management system skips performing the preprocessing and semantics checking steps on the previously generated view parse tree (block 545).

After blocks 535 and 545, the database management system performs a second search of a second cache for the first parameterized SQL view (block 550). In an example, the second cache is a query compile (QC) PSV cache (e.g., QC PSV cache 127 of FIG. 1). If the second search of the second cache for the first parameterized SQL view results in a miss (conditional block 555, "miss" leg), then the database management system generates a first query compile tree (e.g., query compile tree 1000 of FIG. 10) for the first parameterized SQL view based on either the first view parse tree or the previously generated view parse tree (block 560). Next, the database management system generates a query execution plan for the received input query based on the first query compile tree (block 565). It is noted that generating the query execution plan in block 565 may include multiple steps such as generating a query optimizer (QO) tree based on the first query compile tree, applying an optimizer plan based on the QO tree, selecting an optimal plan, and so on.

If the second search of the second cache for the first parameterized SQL view results in a hit (conditional block 555, "hit" leg), then the database management system retrieves, from the second cache, a previously generated query compile tree corresponding to the first parameterized SQL view (block 570). Next, the database management system generates a query execution plan for the received input query based on the previously generated query compile tree (block 575). It is noted that generating the query execution plan in block 575 may include multiple steps such as generating a QO tree based on the previously generated query compile tree, applying an optimizer plan based on the QO tree, selecting an optimal plan, and so on. After blocks 565 and 575, the database management system executes the query execution plan for the received input query (block 580). After block 580, method 500 may end.

It is noted that while the database management system is described as performing the steps of method 500, it should be understood that any component or sub-component of the database management system may perform these steps. Additionally, different components or sub-components may perform different steps of method 500. In other words, a first sub-component may perform a first step, a second sub-component may perform a second step, and so on.

Figure 6A:
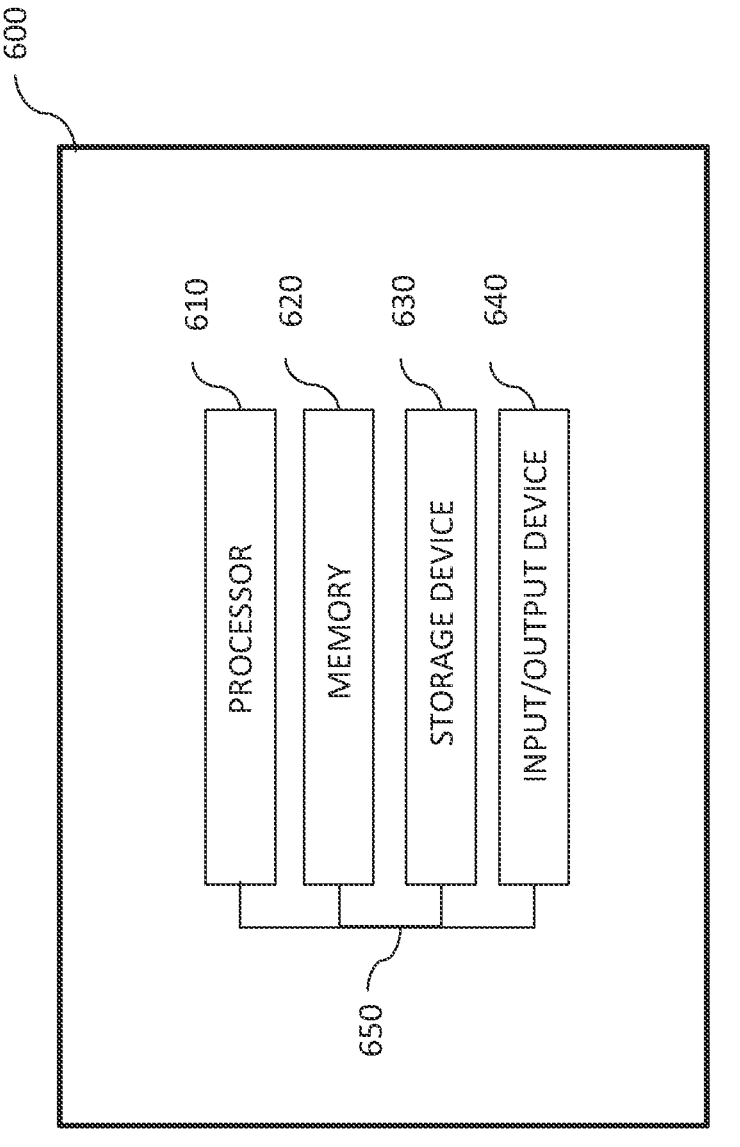
FIG. 6A depicts an example of a system, in accordance with some example implementations of the current subject matter.

In some implementations, the current subject matter may be configured to be implemented in a system 600, as shown in FIG. 6A. The system 600 may include a processor 610, a memory 620, a storage device 630, and an input/output device 640. Each of the components 610, 620, 630 and 640 may be interconnected using a system bus 650. The processor 610 may be configured to process instructions for execution within the system 600. In some implementations, the processor 610 may be a single-threaded processor. In alternate implementations, the processor 610 may be a multi-threaded processor. The processor 610 may be further configured to process instructions stored in the memory 620 or on the storage device 630, including receiving or sending information through the input/output device 640. The memory 620 may store information within the system 600. In some implementations, the memory 620 may be a computer-readable medium. In alternate implementations, the memory 620 may be a volatile memory unit. In yet some implementations, the memory 620 may be a non-volatile memory unit. The storage device 630 may be capable of providing mass storage for the system 600. In some implementations, the storage device 630 may be a computer-readable medium. In alternate implementations, the storage device 630 may be a floppy disk device, a hard disk device, an optical disk device, a tape device, non-volatile solid state memory, or any other type of storage device. The input/output device 640 may be configured to provide input/output operations for the system 600. In some implementations, the input/output device 640 may include a keyboard and/or pointing device. In alternate implementations, the input/output device 640 may include a display unit for displaying graphical user interfaces.

Figure 6B:
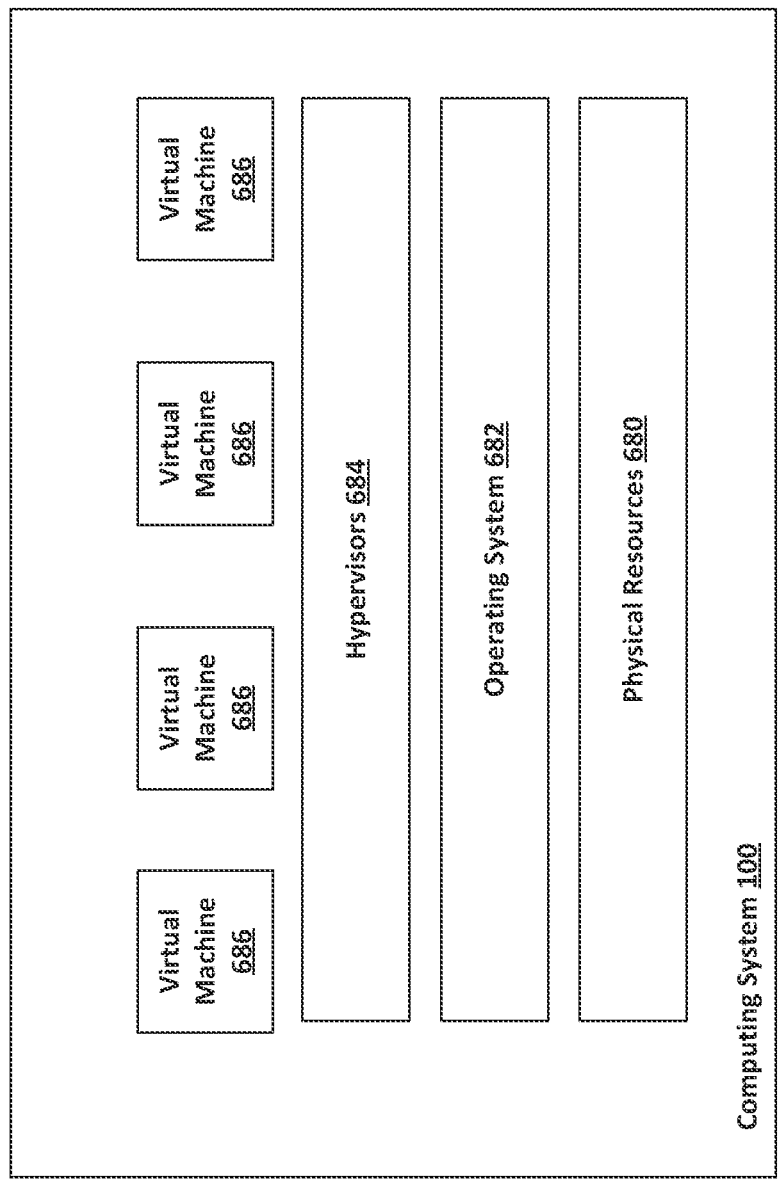
FIG. 6B depicts another example of a system, in accordance with some example implementations of the current subject matter.

FIG. 6B depicts an example implementation of the computing system 100 (of FIG. 1). The computing system 100 may be implemented using various physical resources 680, such as at least one or more hardware servers, at least one storage, at least one memory, at least one network interface, and the like. The computing system 100 may also be implemented using infrastructure, as noted above, which may include at least one operating system 682 for the physical resources 680 and at least one hypervisor 684 (which may create and run at least one virtual machine 686). For example, each multitenant application may be run on a corresponding virtual machine 686.

Figure 7:
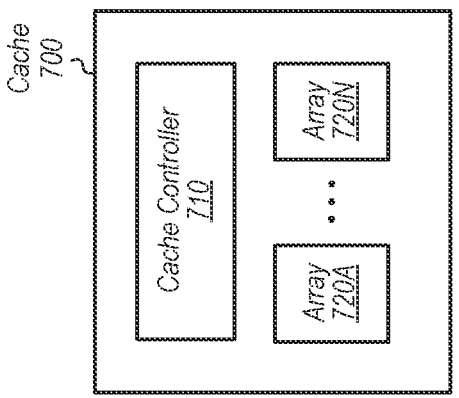
FIG. 7 illustrates a block diagram of a cache, in accordance with some example implementations of the current subject matter.

Referring now to FIG. 7, an example of a cache 700 is depicted in accordance with various embodiments of the current subject matter. In an example, cache 700 includes cache controller 710 and arrays 720A-N, which are representative of any number and type (e.g., data array, tag array) of arrays. Depending on the embodiment, cache 700 may include any suitable type of associative memory. In an example, caches 126 and 127 (of FIG. 1) may be implemented in accordance with the structure of cache 700. Alternatively, one or more of caches 126 and 127 may have other types of suitable structures and/or organizations which may vary from implementation to implementation. Cache controller 710 may be configured to perform read and write operations to arrays 720A-N. Cache controller 710 may also be configured to utilize any of various types of eviction policies (e.g., least recently used (LRU) policy) to evict cache lines from arrays 720A-N when a new cache line is to be stored in arrays 720A-N.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second and the like can, in some situations, relate to an order; as used in a document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include program instructions (i.e., machine instructions) for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives program instructions as a machine-readable signal. The term "machine-readable signal" refers to any signal used to provide machine instructions and/or data to a programmable processor. The machine-readable medium can store such program instructions non-transitorily, such as for example as would a non-transient solid state memory or a magnetic hard drive or any equivalent storage medium. The machine-readable medium can alternatively or additionally store such machine instructions in a transient manner, such as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A computer-implemented method, comprising: parsing a received input query to generate an abstract parse tree; traversing the abstract parse tree to detect a first parameterized structured query language (SQL) view; generating a first view parse tree for the first parameterized SQL view responsive to determining that a first search of a first cache for the first parameterized SQL view results in a miss; retrieving, from the first cache, a previously generated view parse tree corresponding to the first parameterized SQL view responsive to determining that the first search of the first cache for the first parameterized SQL view results in a hit; generating a first query compile tree for the first parameterized SQL view based on the first view parse tree or the previously generated view parse tree responsive to determining that a second search of a second cache for the first parameterized SQL view results in a miss; generating a query execution plan based on the first query compile tree; and executing the query execution plan for the received input query.

Example 2: The computer-implemented method of Example 1, further comprising traversing the first query compile tree to generate a first query optimizer tree.

Example 3: The computer-implemented method of any of Examples 1-2, further comprising performing query optimization on the first query optimizer tree.

Example 4: The computer-implemented method of any of Examples 1-3, further comprising generating the query execution plan based on first query optimizer tree subsequent to performing query optimization on the first query optimizer tree.

Example 5: The computer-implemented method of any of Examples 1-4, further comprising normalizing a first set of input parameters of the first parameterized SQL view into a unified format.

Example 6: The computer-implemented method of any of Examples 1-5, further comprising inserting the first view parse tree in the first cache.

Example 7: The computer-implemented method of any of Examples 1-6, further comprising inserting the first query compile tree in the second cache.

Example 8: The computer-implemented method of any of Examples 1-7, further comprising performing preprocessing and semantics checking on the first view parse tree prior to generating the first query compile tree.

Example 9: The computer-implemented method of any of Examples 1-8, further comprising retrieving, from the second cache, a previously generated query compile tree corresponding to the first parameterized SQL view responsive to determining that the second search of the second cache for the first parameterized SQL view results in a hit.

Example 10: The computer-implemented method of any of Examples 1-9, further comprising generating the query execution plan based on the previously generated query compile tree for the received input query responsive to determining that the second search of the second cache for the first parameterized SQL view results in a hit.

Example 11: A system comprising: at least one processor; and at least one memory including program instructions which when executed by the at least one processor causes operations comprising: parsing a received input query to generate an abstract parse tree; traversing the abstract parse tree to detect a first parameterized structured query language (SQL) view; generating a first view parse tree for the first parameterized SQL view responsive to determining that a first search of a first cache for the first parameterized SQL view results in a miss; retrieving, from the first cache, a previously generated view parse tree corresponding to the first parameterized SQL view responsive to determining that the first search of the first cache for the first parameterized SQL view results in a hit; generating a first query compile tree for the first parameterized SQL view based on the first view parse tree or the previously generated view parse tree responsive to determining that a second search of a second cache for the first parameterized SQL view results in a miss; generating a query execution plan based on the first query compile tree; and executing the query execution plan for the received input query.

Example 12: The system of Example 11, wherein the program instructions are further executable by the at least one processor to cause operations comprising traversing the first query compile tree to generate a first query optimizer tree.

Example 13: The system of any of Examples 11-12, wherein the program instructions are further executable by the at least one processor to cause operations comprising performing query optimization on the first query optimizer tree.

Example 14: The system of any of Examples 11-13, wherein the program instructions are further executable by the at least one processor to cause operations comprising generating the query execution plan based on first query optimizer tree subsequent to performing query optimization on the first query optimizer tree.

Example 15: The system of any of Examples 11-14, wherein the program instructions are further executable by the at least one processor to cause operations comprising normalizing a first set of input parameters of the first parameterized SQL view into a unified format.

Example 16: The system of any of Examples 11-15, wherein the program instructions are further executable by the at least one processor to cause operations comprising inserting the first view parse tree in the first cache.

Example 17: The system of any of Examples 11-16, wherein the program instructions are further executable by the at least one processor to cause operations comprising inserting the first query compile tree in the second cache.

Example 18: The system of any of Examples 11-17, wherein the program instructions are further executable by the at least one processor to cause operations comprising retrieving, from the second cache, a previously generated query compile tree corresponding to the first parameterized SQL view responsive to determining that the second search of the second cache for the first parameterized SQL view results in a hit.

Example 19: The system of any of Examples 11-18, wherein the program instructions are further executable by the at least one processor to cause operations comprising generating the query execution plan based on the previously generated query compile tree for the received input query responsive to determining that the second search of the second cache for the first parameterized SQL view results in a hit.

Example 20: A non-transitory computer readable medium storing instructions, which when executed by at least one data processor, cause operations comprising: parsing a received input query to generate an abstract parse tree; traversing the abstract parse tree to detect a first parameterized structured query language (SQL) view; generating a first view parse tree for the first parameterized SQL view responsive to determining that a first search of a first cache for the first parameterized SQL view results in a miss; retrieving, from the first cache, a previously generated view parse tree corresponding to the first parameterized SQL view responsive to determining that the first search of the first cache for the first parameterized SQL view results in a hit; generating a first query compile tree for the first parameterized SQL view based on the first view parse tree or the previously generated view parse tree responsive to determining that a second search of a second cache for the first parameterized SQL view results in a miss; generating a query execution plan based on the first query compile tree; and executing the query execution plan for the received input query.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method comprising:
   parsing a received input query to generate an abstract parse tree;
   traversing the abstract parse tree to detect a first parameterized structured query language (SQL) view;
   generating a first view parse tree for the first parameterized SQL view responsive to determining that a first search of a first cache for the first parameterized SQL view results in a miss;
   retrieving, from the first cache, a previously generated view parse tree corresponding to the first parameterized SQL view responsive to determining that the first search of the first cache for the first parameterized SQL view results in a hit;
   generating a first query compile tree for the first parameterized SQL view based on the first view parse tree or the previously generated view parse tree responsive to determining that a second search of a second cache for the first parameterized SQL view results in a miss;
   generating a query execution plan based on the first query compile tree; and
   executing the query execution plan for the received input query.

2. The computer-implemented method of claim 1, further comprising traversing the first query compile tree to generate a first query optimizer tree.

3. The computer-implemented method of claim 2, further comprising performing query optimization on the first query optimizer tree.

4. The computer-implemented method of claim 3, further comprising generating the query execution plan based on first query optimizer tree subsequent to performing query optimization on the first query optimizer tree.

5. The computer-implemented method of claim 1, further comprising normalizing a first set of input parameters of the first parameterized SQL view into a unified format.

6. The computer-implemented method of claim 1, further comprising inserting the first view parse tree in the first cache.

7. The computer-implemented method of claim 1, further comprising inserting the first query compile tree in the second cache.

8. The computer-implemented method of claim 1, further comprising performing preprocessing and semantics checking on the first view parse tree prior to generating the first query compile tree.

9. The computer-implemented method of claim 1, further comprising retrieving, from the second cache, a previously generated query compile tree corresponding to the first parameterized SQL view responsive to determining that the second search of the second cache for the first parameterized SQL view results in a hit.

10. The computer-implemented method of claim 9, further comprising generating the query execution plan based on the previously generated query compile tree for the received input query responsive to determining that the second search of the second cache for the first parameterized SQL view results in a hit.

11. A system comprising:

at least one processor; and at least one memory including program instructions which when executed by the at least one processor causes operations comprising:

parsing a received input query to generate an abstract parse tree;

traversing the abstract parse tree to detect a first parameterized structured query language (SQL) view;

generating a first view parse tree for the first parameterized SQL view responsive to determining that a first search of a first cache for the first parameterized SQL view results in a miss;

retrieving, from the first cache, a previously generated view parse tree corresponding to the first parameterized SQL view responsive to determining that the first search of the first cache for the first parameterized SQL view results in a hit;

generating a first query compile tree for the first parameterized SQL view based on the first view parse tree or the previously generated view parse tree responsive to determining that a second search of a second cache for the first parameterized SQL view results in a miss;

generating a query execution plan based on the first query compile tree; and executing the query execution plan for the received input query.

12. The system of claim 11, wherein the program instructions are further executable by the at least one processor to cause operations comprising traversing the first query compile tree to generate a first query optimizer tree.

13. The system of claim 11, wherein the program instructions are further executable by the at least one processor to cause operations comprising performing query optimization on the first query optimizer tree.

14. The system of claim 11, wherein the program instructions are further executable by the at least one processor to cause operations comprising generating the query execution plan based on first query optimizer tree subsequent to performing query optimization on the first query optimizer tree.

15. The system of claim 11, wherein the program instructions are further executable by the at least one processor to cause operations comprising normalizing a first set of input parameters of the first parameterized SQL view into a unified format.

16. The system of claim 11, wherein the program instructions are further executable by the at least one processor to cause operations comprising inserting the first view parse tree in the first cache.

17. The system of claim 11, wherein the program instructions are further executable by the at least one processor to cause operations comprising inserting the first query compile tree in the second cache.

18. The system of claim 11, wherein the program instructions are further executable by the at least one processor to cause operations comprising retrieving, from the second cache, a previously generated query compile tree corresponding to the first parameterized SQL view responsive to determining that the second search of the second cache for the first parameterized SQL view results in a hit.

19. The system of claim 18, wherein the program instructions are further executable by the at least one processor to cause operations comprising generating the query execution plan based on the previously generated query compile tree for the received input query responsive to determining that the second search of the second cache for the first parameterized SQL view results in a hit.

20. A non-transitory computer readable medium storing instructions, which when executed by at least one data processor, cause operations comprising:

parsing a received input query to generate an abstract parse tree;

traversing the abstract parse tree to detect a first parameterized structured query language (SQL) view;

generating a first view parse tree for the first parameterized SQL view responsive to determining that a first search of a first cache for the first parameterized SQL view results in a miss;

retrieving, from the first cache, a previously generated view parse tree corresponding to the first parameterized SQL view responsive to determining that the first search of the first cache for the first parameterized SQL view results in a hit;

generating a first query compile tree for the first parameterized SQL view based on the first view parse tree or the previously generated view parse tree responsive to determining that a second search of a second cache for the first parameterized SQL view results in a miss;

generating a query execution plan based on the first query compile tree; and executing the query execution plan for the received input query.

* * * * *